Oct. 24, 1961  R. M. McCLINTOCK  3,005,332
STRAIN GAGE CALIBRATION DEVICE
Filed March 17, 1959  2 Sheets-Sheet 1
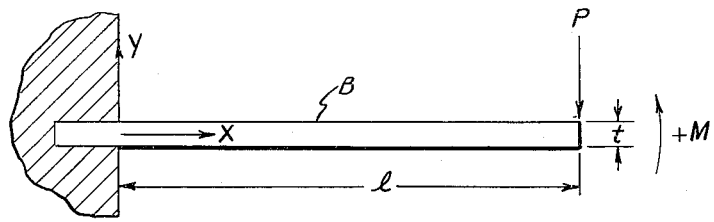
Fig. 1
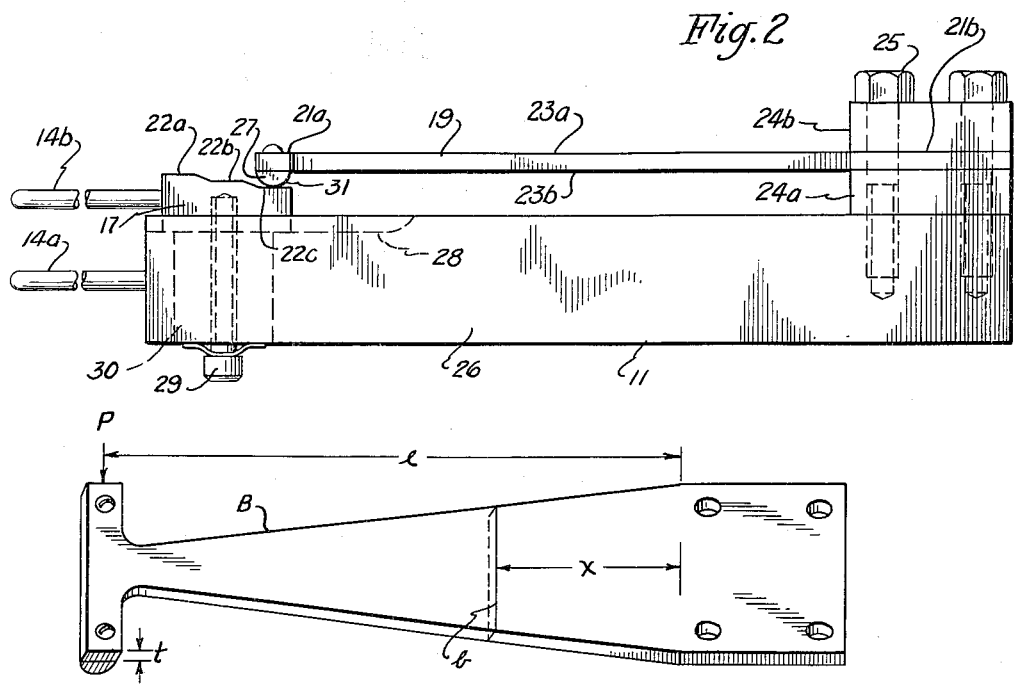
Fig. 2
Fig. 3
INVENTOR
Ralph M. McClintock
BY Arthur Vinograd
John C. Stahl
ATTORNEYS Oct. 24, 1961  R. M. McCLINTOCK  3,005,332
STRAIN GAGE CALIBRATION DEVICE
Filed March 17, 1959  2 Sheets-Sheet 2

INVENTOR
Ralph M. McClintock
BY Arthur Vinograd
John C. Stahl
ATTORNEYS

3,005,332
STRAIN GAGE CALIBRATION DEVICE

Ralph Michael McClintock, Boulder, Colo., assignor to the United States of America as represented by the Secretary of Commerce
Filed Mar. 17, 1959, Ser. No. 800,067
2 Claims. (Cl. 73—1)

The present invention relates to a strain gage calibration device and more particularly to a strain gage calibration device for use in controlled atmospheres and involving extreme temperatures.

The characteristics of electric resistance strain gages have been shown by many authors to be a function of temperature as well as other variables. Study of the characteristics of such gages under extreme environmental conditions is facilitated, in accordance with the principles of the present invention, by a convenient, accurate device for producing known strains on the gages while controlling their environment. The device of the present invention not only meets the requirement of accuracy under extreme environmental conditions, but also has the advantage of requiring no delicate adjustments in order to yield accurate information. Furthermore, the materials of which the device is constructed are not critical.

It is accordingly an immediate object of the present invention to provide a device for producing a predetermined strain in connection with any calibration procedure.

A further object of this invention is to provide a device which enables the rapid, accurate calibration of strain gages.

Still another object is to provide a test device wherein the characteristics of the materials of which the device is constructed are not critical.

Other objects and features of the invention will become apparent to those skilled in the art in the following detailed description of a preferred embodiment of the invention as illustrated in the accompanying drawing in which:

FIG. 1 is a diagrammatic view of a constant strength cantilever beam illustrating the principle upon which the subject invention is based;

FIG. 2 is a side view of a preferred embodiment of the strain gage calibration device;

FIG. 3 is an isometric view of the constant strength cantilever beam shown in FIG. 2;

General

Figure 4:
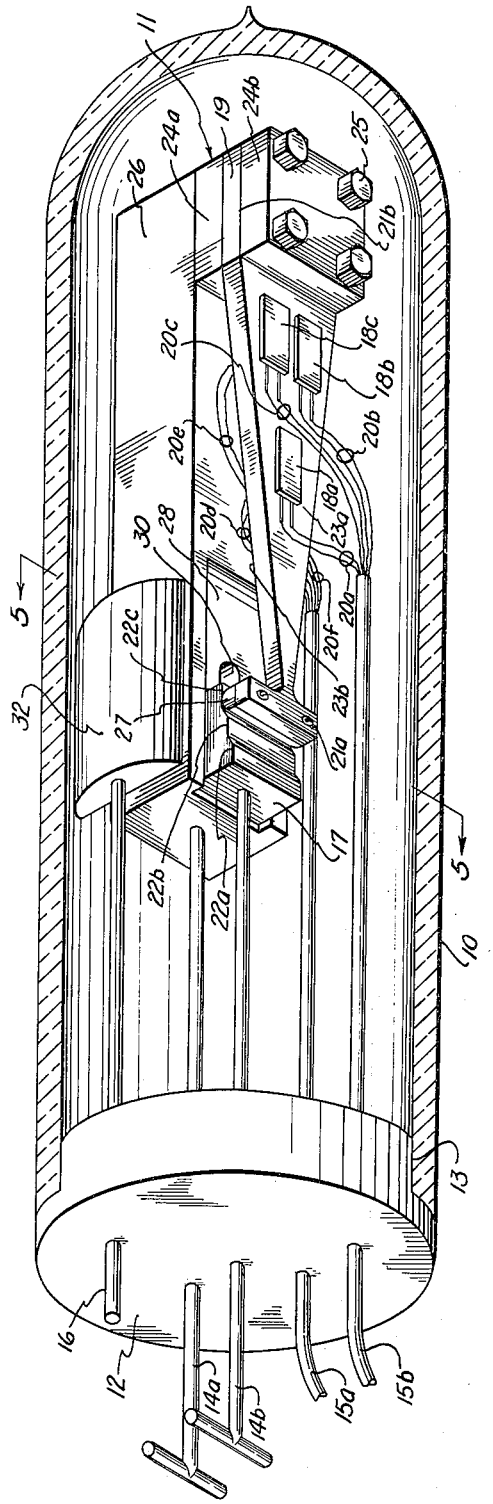
FIG. 4 is an isometric view of a preferred embodiment of the invention including a chamber for providing a controlled temperature environment.
Figure 5:
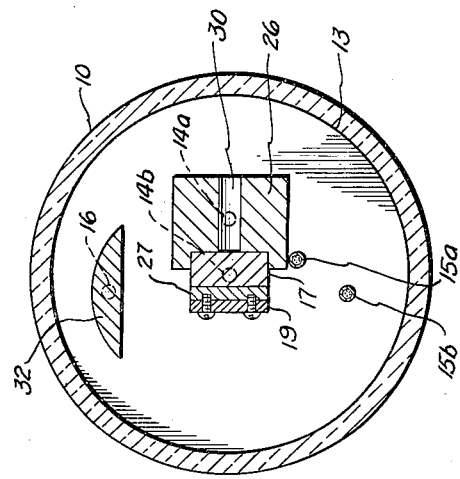
FIG. 5 is a cross-sectional view taken on the line 5—5 of FIG. 4 looking in the direction of the arrows.

In order to provide a better understanding of the structure and operation of the strain gage calibration device, the constant strength cantilever beam, upon which the device is based in principle and as disclosed in FIG. 1 of the drawings, will be discussed with particular reference to the theory involved.

Let a fixed-end cantilever beam B of constant thickness (FIG. 1) be varied in width (see FIG. 3) along its length so that the stress (and consequently the strain, if the beam is homogeneous) is the same everywhere on its upper and lower surface. Considering the beam B as shown in FIG. 1 of the drawings, the stress $\sigma$ applied at any point $x$ on the surface of such a homogeneous isotropic beam is given, for small deflections, by the flexure formula $$\sigma = \frac{Mc}{I} \tag{1}$$

M being the external moment causing bending, $c$ being equal to $t/2$ or the distance from the neutral axis to the surface of the beam, and I the moment of inertia of the cross-sectional area about its central axis.

If the weight of the beam is neglected and the length thereof represented by $l$, the width of a rectangular cross-section by $b$ and the concentrated load at the end P, substituting these values in Equation 1 gives the expression $$\sigma = \frac{Mc}{I} = \frac{P(l-x)(t/2)}{\frac{1}{12}\left(\frac{b}{l}\cdot l\right)t^3} = \frac{6P(l-x)}{bt^2} \tag{2}$$

for the stress at any section of the tapered beam.

Assuming that $\sigma$ and $t$ in Equation 2 are held constant, it is evident that the width $b$ must vary linearly along the length $l$ in accordance with the formula $$b = \frac{6P(l-x)}{\sigma t^2} \tag{3}$$

The relation between deflection of the free end of the beam and the strain on its surface can be deduced from the general condition for equilibrium for an elastic member given by the expression $$M = EI\frac{d^2y}{dx^2} \tag{4}$$

wherein M is the bending moment at the cross section through the point in question, I equals the moment of inertia of the cross section with respect to the neutral axis, E is the modulus of elasticity and $$\frac{d^2y}{dx^2}$$

represents the rate of change of the slope.

The equation of the slope of the elastic curve may be obtained by a single integration of Equation 4 whereas the equation for the deflection may be obtained by integrating Equation 4 twice.

Substituting the value of the bending moment for the beam at any location, $x$, into Equation 4 results in the relation $$EI\frac{d^2y}{dx^2} = -P(l-x) \tag{5}$$

a negative sign precedes P in conformance with conventional standards.

With the aid of Equation 2, Equation 5 reduces to $$\frac{d^2y}{dx^2} = \frac{-2\sigma}{Et} \tag{6}$$

Upon integration of Equation 6 twice and making use of the conditions (a) $\frac{dy}{dx} = 0$ when $x=0$, and (b) $y=0$ when $x=0$ there results $$y = \frac{-\sigma x^2}{Et} \tag{7}$$

Since the maximum deflection occurs when $x=l$ and using Hooke's Law wherein $\sigma = E\epsilon$ ($\epsilon$ equals strain) substitution of these values in Equation 7 results in the relation $$\epsilon = -\frac{\hat{y}t}{l^2} \tag{8}$$

where $\hat{y}$ is the maximum value of $y$, or the deflection at the free end of the beam.

Equation 8 emphasizes that the strain in the surface of the beam is dependent only upon easily measured geometrical factors.

To determine the magnitude of error caused by thermal strains which will affect the accuracy of the results when the device is operating at temperature extremes, the logarithmic derivative of Equation 8

$$\frac{1}{\epsilon}\frac{d\epsilon}{dT} = \frac{1}{\hat{y}}\frac{d\hat{y}}{dT} + \frac{1}{t}\frac{dt}{dT} - \frac{2}{l}\frac{dl}{dT} \qquad (9)$$

may be utilized.

If the stepped block and beam, hereinafter to be described, to which these quantities refer, are both of the same material, the error is zero. In connection with the present invention, however, a stepped block of stainless steel is used to minimize wear and the beam is constructed of aluminum. When the device is cooled from room temperature to 4° K., the quantities $$\frac{1}{t}\frac{dt}{dT}$$

and $$\frac{1}{l}\frac{dl}{dT}$$

cancel each other since they are merely expressions for the thermal expansivity of the beam. The remaining quantities, $$\frac{1}{\hat{y}}\frac{d\hat{y}}{dT}$$

and $$\frac{1}{l}\frac{dl}{dT}$$

are the thermal expansivities of the block and the beam respectively. Integrated over the temperature range in question, these values are 0.0030 and 0.0043, respectively. An error of only 0.13% is evident from these readings. If, however, the thermal characteristics of the parts are known, the correction factor can be applied, even though in most cases it will be negligible.

Referring now to the drawings, wherein like reference characters designate like or corresponding parts throughout the several views, there is shown in FIG. 2 a preferred embodiment of the strain gage calibration device 11 of this invention designed for use in controlled atmospheres, usually involving extreme temperatures.

One conventional or exemplary means of providing a constant temperature environment is shown in FIG. 4 wherein a wide-mouth Dewar 10, adapted to receive a liquid refrigerant, is held in a vertical position and the strain gage calibration device 11 is inserted therein. In carrying the present invention into effect various liquid refrigerants may be utilized in Dewar 10, as for example, helium, hydrogen, neon or nitrogen. Optionally, various other means to maintain a constant temperature environment may be utilized, as for example, conventional refrigerator coils or heater elements.

End member 12 is inserted in tubular wall 13 of Dewar 10 (see FIG. 4) and has a plurality of openings through which push rods 14a—14b, conduits 15a—15b, and liquid level indicator rod 16 extend and connect the elements in the controlled media with the external environment. For example, known strains may be produced on the surface of the beam from the external environment by adjusting push rod 14b connected to stepped block 17. Push rod 14a connects with frame 26 so that the device can be held steady from the external environment. Strain gages 18, specifically 18a–18c, attached to constant strength cantilever beam 19, are subjected to the known strains on said beam. The strain gages are connected by leads 20 and thence by conduits 15a—15b to a strain gage indicator (not shown). A liquid level indicator float 32 is attached to indicator rod 16 whereby the extent of the refrigerant within container 10 may readily be ascertained.

Leads 20a are attached to strain gage 18a and connect with the external environment through conduit 15b; in like manner, leads 20b attach to strain gage 18b and leads 20c attach to gage 18c. Strain gages may also be applied to the lower tension surface of beam 19 and are connected with their respective leads 20d–20f and thence through conduits 15a to the external environment.

The calibration device comprises a constant strength cantilever beam 19 dimensioned in accordance with the theory outlined above. Beam 19 (see FIGS. 3 and 4) is secured to a supporting frame 26 at one end, 21b, thereof while the other end, 21a, abuts stepped portions 22a–22c of a movable, stepped block 17. Mounting bolts 25, machined to insure accurate relocation of beam 19 for a purpose to be described, pass through clamping blocks 24a—24b securing the beam 19 to the frame 26. The strain gages 18, specifically 18a–18c (see FIG. 4), are applied to the upper (compression) surface 23a and the lower (tension) surface 23b of the beam 19 by an adhesive such as filled epoxy resin adhesive. Since the strain is constant over the entire length of the beam 19 except near the ends 21a—21b, as has been pointed out, the point of attachment of the gages is not critical.

Stepped block 17, as best seen in FIGS. 2 and 4 of the drawings, contacts a pressure bar 27 secured to the free end 21a of beam 19. The stepped block is adapted to be manipulated by a push rod 14b attached thereto. The line of contact between stepped block 17 and the cylindrical surface 31 of pressure bar 27 intersects a line drawn perpendicular to the neutral stress plane of beam 19 at the point where the apex of the triangular configuration of the beam 19 would be.

Block 17 is accurately machined so that the difference in height between any two steps, 22a—22b, 22b—22c (see FIG. 2) represents a known deflection of the free end of the beam 19. Consequently, a predetermined strain may be produced on beam 19 by pushing the stepped block inwardly as viewed in FIG. 2. Stepped block 17 is slidably mounted in a recessed portion 28 of frame 26 and is retained by a tension screw 29 inserted through an elongated slot 30. It should be understood, however, that the principles of the invention are not limited to the illustrated embodiment but also includes rotary stepped cams or other means for producing predetermined strains on the beam.

Gages can be calibrated in both tension and compression by attaching them to opposite surfaces of beam 19. Deflection of the beam by manipulation of the stepped block will thus enable the gages on the upper surface 23a, as viewed in FIG. 4, to be calibrated in compression while those on the lower surface will be calibrated in tension. The beam 19 is reversed in its mounting by means of the bolts 25, the pressure bar 27 is secured to the opposite surface 23b and the gages can then readily be calibrated for strains of the opposite sense.

Mounting bolts 25, clamping blocks 24a—24b and constant strength cantilever beam 19 preferably should be made of the same material to minimize relative dimensional changes in these parts from thermal strains as illustrated by Equation 9. The particular material of which the calibrating device as a whole is constructed is not critical. Application of a force by the action of stepped block 17 against the pressure bar 27 causes an equal and opposite force on the frame 26. In order to minimize the error caused by deflection of the frame, it is made considerably heavier than the beam 19 and of a metal having a higher modulus of elasticity. A frame of steel with a beam of aluminum, for example, gives a favorable modulus ratio of approximately three to one.

It will be apparent that the embodiments shown are only exemplary and that various modifications can be made in construction and arrangement within the scope of invention as defined in the appended claims.

What is claimed is:

1. An electrical strain gage calibration device comprising a Dewar assembly containing a liquid refrigerant, a frame, a recessed portion in said frame parallel to the length thereof, a constant strength cantilever beam secured to said frame at one end thereof, a plurality of strain gages attached to opposite sides of said beam, a push rod attached to said frame to advance the frame into the Dewer assembly, a stepped block slidably mounted in said recessed portion of said frame and bearing against said frame, a pressure bar attached to the free end of said beam and in contact with one surface of the stepped block and a push rod attached to said stepped block for selectively positioning said block on the frame.

2. An electric strain wire transducer calibration device comprising a Dewar assembly containing a refrigerant, a frame, a recessed portion in said frame parallel to the length thereof, means positioning said frame in said Dewar assembly, a constant strength cantilever beam detachably mounted on one end of said frame, a pressure bar mounted on the free end of said cantilever beam, a transducer element to be calibrated attached to said cantilever beam, a stepped block slidably mounted in said recessed portion and bearing against said frame and means for selectively positioning one surface of said stepped block in contact with said pressure bar.

References Cited in the file of this patent

UNITED STATES PATENTS

| | | |
|---|---|---|
| 1,922,302 | King | Aug. 15, 1933 |
| 2,227,938 | Krebs | Jan. 7, 1941 |
| 2,789,427 | Brier | Apr. 23, 1957 |
| 2,901,905 | Horst | Sept. 1, 1959 |